US012574619B2

(12) United States Patent
Liu et al.

(10) Patent No.: US 12,574,619 B2
(45) Date of Patent: Mar. 10, 2026

(54) DISPLAY CALIBRATION MECHANISM AND EXTERNALLY-HUNG THERMAL IMAGING DEVICE

(71) Applicant: Guangxi Noct Tech Limited Liability Company, Nanning (CN)

(72) Inventors: Changru Liu, Nanning (CN); Xinjie Xiao, Nanning (CN); Chenyi Zeng, Nanning (CN)

(73) Assignee: Guangxi Meet Tech Limited Liability Company, Nanning (CN)

( * ) Notice: Subject to any disclaimer, the term of this patent is extended or adjusted under 35 U.S.C. 154(b) by 165 days.

(21) Appl. No.: 18/628,686

(22) Filed: Apr. 6, 2024

(65) Prior Publication Data

US 2024/0251147 A1 Jul. 25, 2024

(30) Foreign Application Priority Data

Dec. 1, 2023 (CN) .......................... 202311641737.7

(51) Int. Cl.
H04N 23/53 (2023.01)
H04N 23/23 (2023.01)
(52) U.S. Cl.
CPC ............. H04N 23/53 (2023.01); H04N 23/23 (2023.01)

(58) Field of Classification Search
CPC .............................. H04N 23/23; H04N 23/53
See application file for complete search history.

(56) References Cited

U.S. PATENT DOCUMENTS

| | | |
|---|---|---|
| 2010/0182335 A1 | 7/2010 | Holub |
| 2012/0033272 A1 | 2/2012 | Lee et al. |
| 2013/0127785 A1 | 5/2013 | Wang |

FOREIGN PATENT DOCUMENTS

WO WO-2024065607 A1 * 4/2024 ............. G02B 13/14

* cited by examiner

*Primary Examiner* — Kathleen V Nguyen
(74) *Attorney, Agent, or Firm* — Hemisphere Law, PLLC

(57) ABSTRACT

The present invention discloses a display calibration mechanism for enabling a thermal imaging picture to be aligned with a low-light-level picture on a low-light-level night-vision device, including a base and an adjustment assembly, wherein the base is provided with an imaging member and a display, and the thermal imaging picture on the display and the low-light-level picture on the low-light-level night-vision device are simultaneously imagable on the imaging member, The present invention further discloses an externally-hung thermal imaging device. The adjustment of the relative positions of the thermal imaging picture and the low-light-level picture can be realized to ensure the imaging effect while improving the universality of the thermal imaging device itself.

10 Claims, 4 Drawing Sheets

DISPLAY CALIBRATION MECHANISM AND EXTERNALLY-HUNG THERMAL IMAGING DEVICE

TECHNICAL FIELD

The present invention relates to the field of night-vision devices, and more particularly to a display calibration mechanism and an externally-hung thermal imaging device.

BACKGROUND ART

The low-light-level night-vision device refers to a device which makes use of a night sky light in the nature such as weak moonlight, starlight, atmospheric glow, galactic light and the like for illumination, amplifies and converts the weak photons reflected by the target into visible images by means of light intensifier to realize night observation. The low-light-level night-vision device is a night-vision device working in the visible light to near-infrared range with a working wavelength range of from 0.4 μm to 1.1 μm, imaging by mainly relying on the reflection of night sky light and atmospheric glow on the target. The typical second-generation and third-generation low-light-level night-vision devices can work completely passively without active illumination in most cases. Because of its relatively good sensitivity in the visible light range, its imaging characteristics are similar to those of the naked eye, and it can effectively distinguish the target without much training. However, when the ambient light is less than $1\times10^{-5}$ lux, the low-light-level night-vision device cannot perform clear imaging, and when the ambient light is extremely weak, it needs to work relying on an externally-hung light supplement lamp.

Thermal imagers convert the invisible infrared energy emitted by an object into a visible thermal image, and different colors on the thermal image represent different temperatures of the measured object. The thermal imager has the advantages that it is capable of distinguishing the temperature difference, displaying a variety of thermal imaging modes, and it is easy to spot objects with different temperature difference and find targets. The thermal imager is a night-vision device working in long-wave infrared with a working wavelength range of from 8 to 12 μm, imaging by mainly relying on blackbody radiation generated spontaneously by objects whose temperature is higher than absolute zero. Its imaging ability is hardly affected by the environmental light. In almost all cases, it is in a passive working state, heat distribution can be observed and the objects with different temperatures but the same appearance can be distinguished. However, long-wave infrared imaging features are significantly different from visible light, such as: long-wave infrared cannot penetrate glass, water surface, etc.; the typical resolution of miniaturized long-wave infrared imaging devices is VGA class, i.e., 640×480 or 640×512, and the number of picture elements is 30,000 to 40,000, which is much smaller than the equivalent number of three to five million of low-light-level night-vision devices using a typical 18 mm image intensifier.

Therefore, a target cannot be well determined when relying only on a thermal imager or only on a low-light-level night-vision device during use, and it is necessary to combine a low-light-level night-vision device with a thermal imager, and superimpose a long-wave infrared image on a low-light-level image (or vice versa); such a night-vision device is generally referred to as a low-light-level and thermal fusion night-vision device, and this low-light-level and thermal fusion night-vision device effectively solves the problems of a low-light-level night-vision device that is difficult to image in extreme darkness, and the problems that the imaging characteristics of the thermal imager are too far away from the naked eye and the resolution of thermal imager is low.

In the prior art, if a low-light-level night-vision device needs to realize thermal imaging fusion, it is mainly realized by an integrated low-light-level and thermal fusion night-vision device. However, the integrated low-light-level and thermal fusion night-vision device cannot be upgraded on the existing device, and has the characteristics of complex structure and expensive procurement. In addition, due to the different development of low-light-level night-vision devices in different regions, many users have purchased low-light-level night-vision devices. If the user group subsequently needs to integrate the two functions of low light and thermal imaging, an integrated low-light-level and thermal fusion night-vision device needs to be added, which will increase more additional costs and a waste of existing low-light-level night-vision devices.

In addition to the integrated low-light-level and thermal fusion night-vision device, there is an externally-hung front low-light-level and thermal fusion night-vision device, or referred to as a clip-type thermal imaging device, for example, the night-vision device disclosed in Chinese utility model patent with the publication No. CN214623184U. Such a night-vision device is implemented by mounting a thermal imager on the low-light-level night-vision device as a separate module; the thermal imager displays the thermal imaging image on a micro-display after processing; the image on the micro-display is projected into objective lens of the low-light-level night-vision device through a specially designed optical system; the objective lens of the low-light-level night-vision device simultaneously receives the image from the scene and the image from the thermal imaging night-vision device and performs imaging; since the projector optical system of the thermal imager is coaxial with an optical axis of the low-light-level night-vision device through a specially designed optical system and the focal power is equivalent to infinity, the thermal imaging image will be superimposed on the low-light-level image. The front low light and thermal fusion mainly has the advantages that it can be compatible with almost all low-light-level night-vision devices, and has the disadvantages that the working mode thereof requires projecting a thermal imaging image into the low-light-level night-vision device for imaging. The high-light thermal imaging image will affect the working performance of the low-light-level night-vision device and reduce the resolution thereof, and may cause burns to the low-light-level night-vision device in an extreme case. In addition, the above-mentioned optical system is generally a fixed-focus system, and the fixed-focus system reaches infinity. If the low-light-level night-vision device is focused to a near position, the thermal imaging image projected into the low-light-level night-vision device will not be focused, thus affecting the imaging of the low-light-level night-vision device. In addition, although the externally-hung front low-light-level and thermal fusion night-vision device can display a thermal imaging picture on the original low-light-level night-vision device, its imaging needs to pass a low-light-level image intensifying tube which performs a monochrome imaging and cannot display color characters or color images.

Another type of externally-hung low-light-level and thermal fusion night-vision device is implemented by mounting a thermal imager and a low-light-level night-vision device together, and both of them image by a separate display, and then the low-light-level image and the thermal imaging image are stitched and fused by using a prism, so that the thermal imaging image is superimposed on the low-light-level image with a certain transparency, and then magnified by an eyepiece optical system and then entered into a human eye for imaging, for example, the night-vision device disclosed in the Chinese utility model patent with the publication No. CN219162478U. Such a low-light-level and thermal fusion night-vision device is generally referred to as an externally-hung rear low-light-level and thermal fusion night-vision device. Since the thermal imaging and the low-light-level image separately for the externally-hung rear low-light-level and thermal fusion night-vision device, the thermal imaging picture does not affect the low-light-level picture, and both of them can be separately set with different focusing points. However, the traditional externally-hung rear low-light-level and thermal fusion night-vision device fuses thermal imaging images and low-light-level images with a prism optical system mainly relying on a complex eyepiece design, which has high cost, weight and volume, difficult maintenance and low maintainability. Further, the rear thermal fusion night-vision device can basically only adapt to a specific type of low-light-level night-vision element, and basically lacks universality.

In summary, in the existing night-vision device products, there is no device capable of simultaneously having the advantages of the above-mentioned externally-hung front low-light-level and thermal fusion night-vision device and the above-mentioned externally-hung rear low-light-level and thermal fusion night-vision device, that is, the existing products cannot improve the universality and ensure the imaging effect at the same time; in addition, the existing low-light-level and thermal fusion night-vision devices cannot adjust the relative positions of the thermal imaging picture and the low-light-level picture, which is inconvenient for the alignment and calibration of the picture and cannot ensure the imaging effect.

SUMMARY OF THE INVENTION

The present invention aims to solve at least one of the technical problems existing in the prior art. To this end, the present invention provides a display calibration mechanism capable of adjusting the relative positions of a thermal imaging picture and a low-light-level picture, facilitating alignment calibration of the pictures, and ensuring imaging effects.

The present invention also provides an externally-hung thermal imaging device having a display calibration mechanism as described above, capable of ensuring an imaging effect while improving the universality of the thermal imaging device itself.

The display calibration mechanism according to an embodiment of a first aspect of the present invention for adjusting a position of a thermal imaging picture so that the thermal imaging picture can be aligned with a low-light-level picture on a low-light-level night-vision device, including a base provided with an imaging member and a display for displaying a thermal imaging picture, the thermal imaging picture on the display and the low-light-level picture on the low-light-level night-vision device are simultaneously imagable on the imaging member, and an adjustment assembly located on the base for adjusting the position of the display relative to the base, when the position of the display relative to the base changes, the position of the thermal imaging picture on the imaging member changes accordingly, and the adjustment assembly includes: a lateral adjustment unit including a lateral sliding block and a lateral adjustment screw, wherein the lateral sliding block is slidably provided on the base in a first direction, the lateral adjustment screw is rotatably provided on the base, and the lateral adjustment screw is used for adjusting the position of the lateral sliding block relative to the base in the first direction; and a longitudinal adjustment unit including a longitudinal sliding block and a longitudinal adjustment screw, wherein the display is mounted on the longitudinal sliding block slidably provided on the lateral sliding block in a second direction, and the second direction is perpendicular to the first direction, the longitudinal adjustment screw is rotatably provided on the base, and the longitudinal adjustment screw is used for adjusting the position of the longitudinal sliding block relative to the base in the second direction.

There are at least the following beneficial effects: when it is desired to adjust the position of the thermal imaging picture presented on the imaging member so that the thermal imaging picture on the imaging member can be aligned with the low-light-level picture on the low-light-level display, the position of the display can be adjusted by the display calibration mechanism of the present invention. Specifically, when a lateral adjustment screw is rotated, it can adjust the position of a lateral sliding block relative to a base in a first direction, and during the sliding of the lateral sliding block, a longitudinal sliding block provided on the lateral sliding block also simultaneously slides in the first direction; when the longitudinal adjustment screw is rotated, the longitudinal adjustment screw can adjust the position of the longitudinal sliding block relative to the base in the second direction; since the display for displaying the thermal imaging picture is provided on the longitudinal sliding block, after the lateral adjustment screw and the longitudinal adjustment screw are rotated, the position of the display relative to the base can be changed; since the imaging member is provided on the base, the position of the thermal imaging picture on the imaging member can be changed accordingly; by appropriately adjusting the lateral adjustment screw and the longitudinal adjustment screw, the thermal imaging picture and the low-light-level picture can be aligned in an overlapping manner, it is convenient to adjust, and it is convenient for the user to obtain the overlapped image information.

According to some embodiments of the present invention, a knob is provided at an end of the longitudinal adjustment screw and is provided with a limiting slot in a circumferential direction, the base is provided with a guide groove in the first direction, two guide blocks are symmetrically provided at a notch of the guide groove, both of the guide blocks extend in the first direction, the knob is slidingly received in the guide groove in the first direction, and the two guide blocks are symmetrically inserted into the limiting slot to prevent the knob from escaping from the guide groove in the second direction during sliding.

According to some embodiments of the present invention, a positioning member is provided on the base, located on one side of the knob in the first direction and is threadedly connected to the base, an edge of the positioning member is inserted into the limiting slot, and the positioning member can depress the knob to stop rotation of the longitudinal adjustment screw.

According to some embodiments of the present invention, a limiting column is further provided on the base, slidably provided on the base in a second direction and is located on one side of the longitudinal sliding block facing away from the knob, the limiting column is elastically connected to the base and can push the longitudinal sliding block in the second direction at all times, one end of the longitudinal sliding block facing the limiting column is provided with a groove, the bottom surface of the groove is arc-shaped, wedge-shaped, dovetail-shaped or planar, and the top surface of the limiting column is an arc-shaped surface, a wedge-shaped surface, a dovetail-shaped surface or a plane which conforms to the groove; the limiting column abuts against the groove through a top surface of the limiting column, and the groove extends in the first direction.

According to some embodiments of the present invention, a first guide column and a second guide column are provided on the lateral sliding block and are provided in the first direction and both extend in the second direction, a cross section of the first guide column on a plane perpendicular to the second direction is dovetail-shaped or wedge-shaped, a cross section of the second guide column on a plane perpendicular to the second direction is square, the longitudinal sliding block is provided with a first sliding groove and a second sliding groove which are slidably fitted with and have shapes conforming to the first guide column and the second guide column respectively.

According to some embodiments of the present invention, either the lateral sliding block or the longitudinal sliding block is provided with a guide bolt and the other with a kidney-shaped slot extending in a second direction, the guide bolt is slidable in the second direction relative to the kidney-shaped slot, and an axis of the guide bolt is perpendicular to both the first direction and the second direction.

According to some embodiments of the present invention, the lateral sliding block is provided with a first threaded hole in the first direction, the lateral adjustment screw is in threaded engagement with the first threaded hole, the longitudinal sliding block is provided with a second threaded hole in the second direction, the longitudinal adjustment screw is in threaded engagement with the second threaded hole, the lateral adjustment screw is sleeved with a compression spring having one end abut against the lateral sliding block and the other end abut against the base.

According to some embodiments of the present invention, the lateral sliding blocks are provided with bumps at both ends in the second direction, respectively, and the bumps are slidably received in the base in the first direction.

An externally-hung thermal imaging device according to a second aspect embodiment of the present invention includes a display calibration mechanism according to the above-described first aspect embodiment of the present invention, and further includes: a thermal imager provided on the base and electrically connected to a display, the display being capable of receiving and displaying thermal imaging pictures acquired by the thermal imager; a projector provided on the base for mapping the thermal imaging picture displayed on the display onto an imaging member; wherein the base is configured to be connectable to a low-light-level night-vision device and to position the imaging member at a position corresponding to a low-light-level picture on the low-light-level night-vision device, the imaging member is a transparent member and is transmissive to the low-light-level picture on the low-light-level night-vision device.

There are at least the following beneficial effects: when in use, the externally-hung thermal imaging device is firstly mounted on the low-light-level night-vision device in the prior art, and the imaging member is made to correspond to the low-light-level picture of the low-light-level night-vision device; since the display can display the thermal imaging picture acquired by the thermal imager, and the projector can map the thermal imaging picture onto the imaging member, a user can simultaneously observe the low-light-level picture displayed through the imaging member and the thermal imaging picture mapped onto the imaging member, the two pictures are superposed at the position of the imaging member to overcome the problem that the traditional front low-light-level and thermal fusion night-vision device cannot display colors, the problem of halos and reflected light in strong light environment, and the problem of image blurring when focusing near, and also solve the problem that the traditional rear low-light-level and thermal fusion night-vision device can reduce the low-light-level channel brightness and the problem of poor universality caused by reflecting the thermal imaging image into the eyepiece through the prism.

According to some embodiments of the present invention, the imaging member is an optical waveguide glass, the base is connectable to an eyepiece of the low-light-level night-vision device, and the imaging member is provided coaxially with the eyepiece of the low-light-level night-vision device and on one side of the eyepiece closer to a human eye.

Additional aspects and advantages of the present invention will be set forth in part in the description which follows and, in part, will be obvious from the description, or may be learned by practice of the present invention.

BRIEF DESCRIPTION OF THE DRAWINGS

The present invention will now be further described, by way of example only, with reference to the accompanying drawings, in which.

Figure 1:
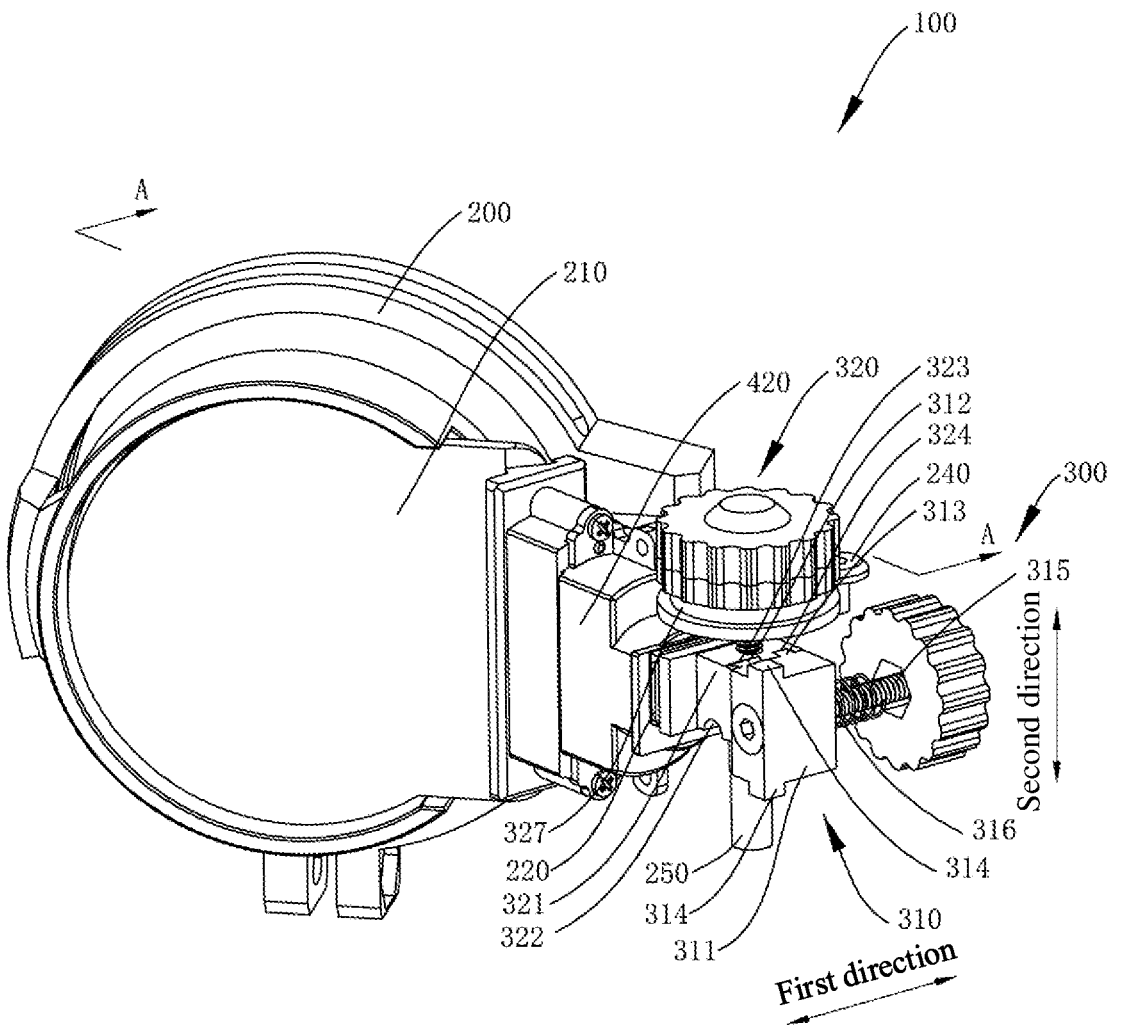
FIG. 1 is a schematic structural diagram showing a base with a portion of the base being hidden according to an embodiment of the present invention.

REFERENCE NUMERALS display calibration mechanism 100;
base 200, imaging member 210, display 220, guide groove 230, guide block 231, positioning member 240, limiting column 250;
adjustment assembly 300, lateral adjustment unit 310, lateral sliding block 311, first guide column 312, second guide column 313, bump 314, lateral adjustment screw 315, compression spring 316, longitudinal adjustment unit 320, longitudinal sliding block 321, groove 322, first sliding groove 323, second sliding groove 324, longitudinal adjustment screw 325, knob 326, limiting slot 327, second threaded hole 328;
externally-hung thermal imaging device 400, thermal imager 410, projector 420;
low-light-level night-vision device 500, eyepiece 510.

DETAILED DESCRIPTION OF THE INVENTION

Reference will now be made in detail to the embodiments of the present invention, examples of which are illustrated in the accompanying drawings, wherein like reference numerals refer to the same or similar elements throughout the several views, and wherein like reference numerals refer to the same or similar elements throughout the several views. The embodiments described below with reference to the drawings are illustrative only and are not to be construed as limiting the present invention.

In describing the present invention, it is to be understood that the orientation or positional relationships indicated in connection with the orientation description, e.g., first direction, second direction, etc. are based on the orientation or positional relationships shown in the drawings and are merely for convenience in describing and simplifying the present invention and do not indicate or imply that the device or element being referred to must have a particular orientation, be constructed and operated in a particular orientation and, therefore, should not be construed as limiting the present invention.

In the description of the present invention, if the first and second descriptions are provided for an objective of distinguishing between technical features, they should not be construed as indicating or implying relative importance or implicitly indicating the number of technical features indicated or the precedence of the technical features indicated.

In the description of the present invention, unless otherwise explicitly defined, provided, installed, connected, etc. terms are to be understood broadly, and a person skilled in the art can reasonably determine the specific meaning of the above terms in the present invention in combination with the specific content of the technical solution.

Figure 2:
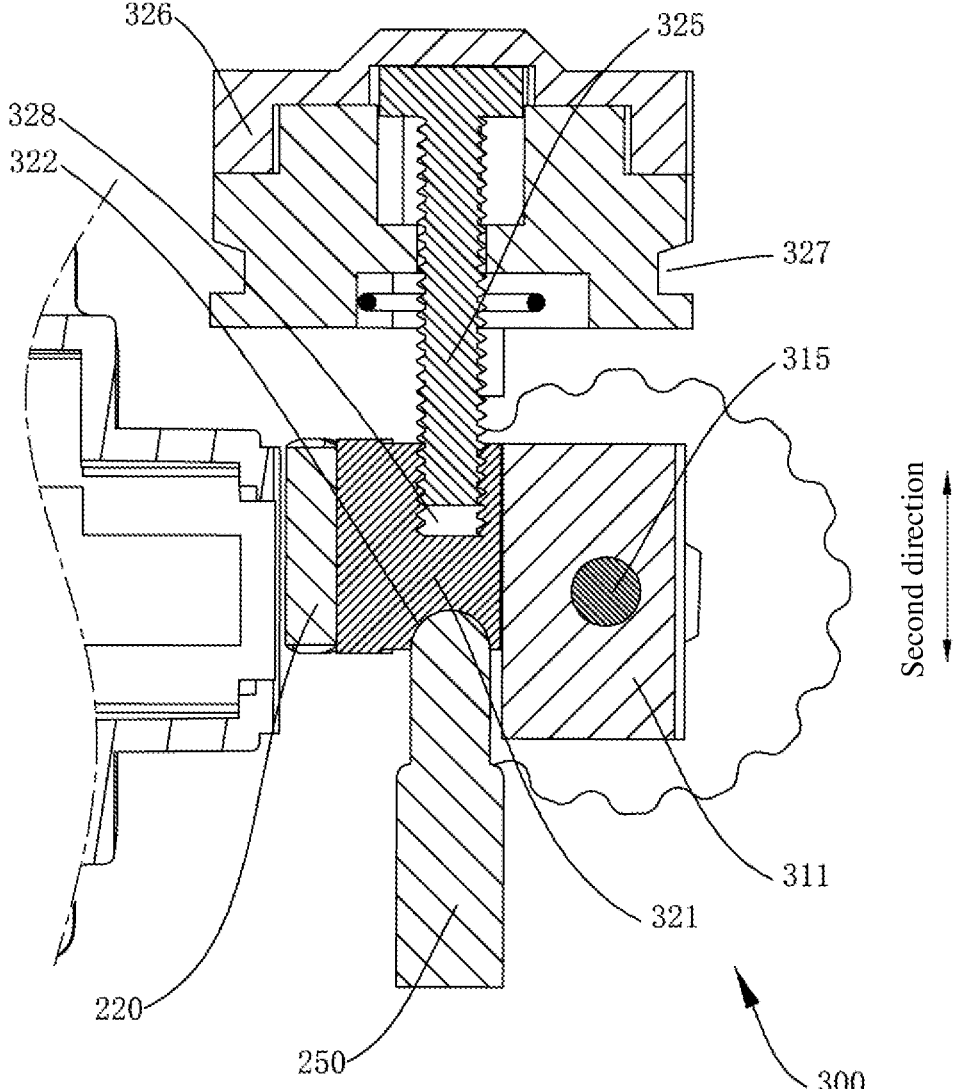
FIG. 2 is a schematic structural diagram showing a cross section taken along the line A-A in FIG. 1.

As shown in FIGS. 1 and 2, the present invention discloses a display calibration mechanism 100 for adjusting a position of a thermal imaging picture so that the thermal imaging picture can be aligned with a low-light-level picture on a low-light-level night-vision device 500, including a base 200 provided with an imaging member 210 and a display 220 for displaying a thermal imaging picture, the thermal imaging picture on the display 220 and the low-light-level picture on the low-light-level night-vision device 500 are simultaneously imagable on the imaging member 210, and an adjustment assembly 300 on the base 200 for adjusting the position of the display 220 relative to the base 200, when the position of the display 220 relative to the base 200 changes, the position of the thermal imaging picture on the imaging member 210 changes accordingly, and the adjustment assembly 300 includes a lateral adjustment unit 310 and a longitudinal adjustment unit 320.

The lateral adjustment unit 310 includes a lateral sliding block 311 and a lateral adjustment screw 315, wherein the lateral sliding block 311 is slidably provided on the base 200 in a first direction, the lateral adjustment screw 315 is rotatably provided on the base 200, the lateral adjustment screw 315 is used for adjusting the position of the lateral sliding block 311 relative to the base 200 in the first direction, the longitudinal adjustment unit 320 includes a longitudinal sliding block 321 and a longitudinal adjustment screw 325, the display 220 is mounted on the longitudinal sliding block 321, and the longitudinal sliding block 321 is slidably provided on the lateral sliding block 311 in a second direction; the second direction is perpendicular to the first direction, and the longitudinal adjustment screw 325 for adjusting the position of the longitudinal sliding block 321 relative to the base 200 in the second direction is rotatably provided on the base 200.

It will be appreciated that when it is desired to adjust the position of the thermal imaging picture presented on the imaging member 210 so that the thermal imaging picture on the imaging member 210 can be aligned with the low-lightlevel picture on the low-light-level night-vision device 500, the position of the display 220 can be adjusted by the display calibration mechanism 100 of the present invention. Specifically, when a lateral adjustment screw 315 is rotated, it can adjust the position of a lateral sliding block 311 relative to the base 200 in a first direction, and during the sliding of the lateral sliding block 311, a longitudinal sliding block 321 provided on the lateral sliding block 311 also simultaneously slides in the first direction; when the longitudinal adjustment screw 325 is rotated, the longitudinal adjustment screw 325 can adjust the position of the longitudinal sliding block 321 relative to the base 200 in the second direction; since the display for displaying the thermal imaging picture is provided on the longitudinal sliding block 321, after the lateral adjustment screw 315 and the longitudinal adjustment screw 325 are rotated, the position of the display 220 relative to the base 200 can be changed; since the imaging member 210 is provided on the base 200, the position of the thermal imaging picture on the imaging member 210 can be changed accordingly; by appropriately adjusting the lateral adjustment screw 315 and the longitudinal adjustment screw 325, the thermal imaging picture and the low-light-level picture can be aligned in an overlapping manner, it is convenient to adjust, and it is convenient for the user to obtain the overlapped image information.

It should be noted that the thermal imaging picture on the display 220 and the low-light-level picture on the low-light-level night-vision device 500 can be simultaneously imaged on the imaging member 210, including imaging on the naked eye of a person or in a television imaging device with a complete objective lens, and the above-mentioned imaging actions specifically include transmission and mapping, i.e., the picture can pass through the imaging member 210 and be seen by the human eye, and the picture can also be displayed on the imaging member 210 and be seen by the human eye.

In addition, the first direction and the second direction referred to in the present invention may be determined according to actual situations, for example, the first direction may be a front-rear direction and the second direction may be a vertical direction, and of course, in general, the first direction may not coincide with the front-rear direction or the left-right direction, but may be inclined with respect to the front-rear direction or the left-right direction.

Figure 3:
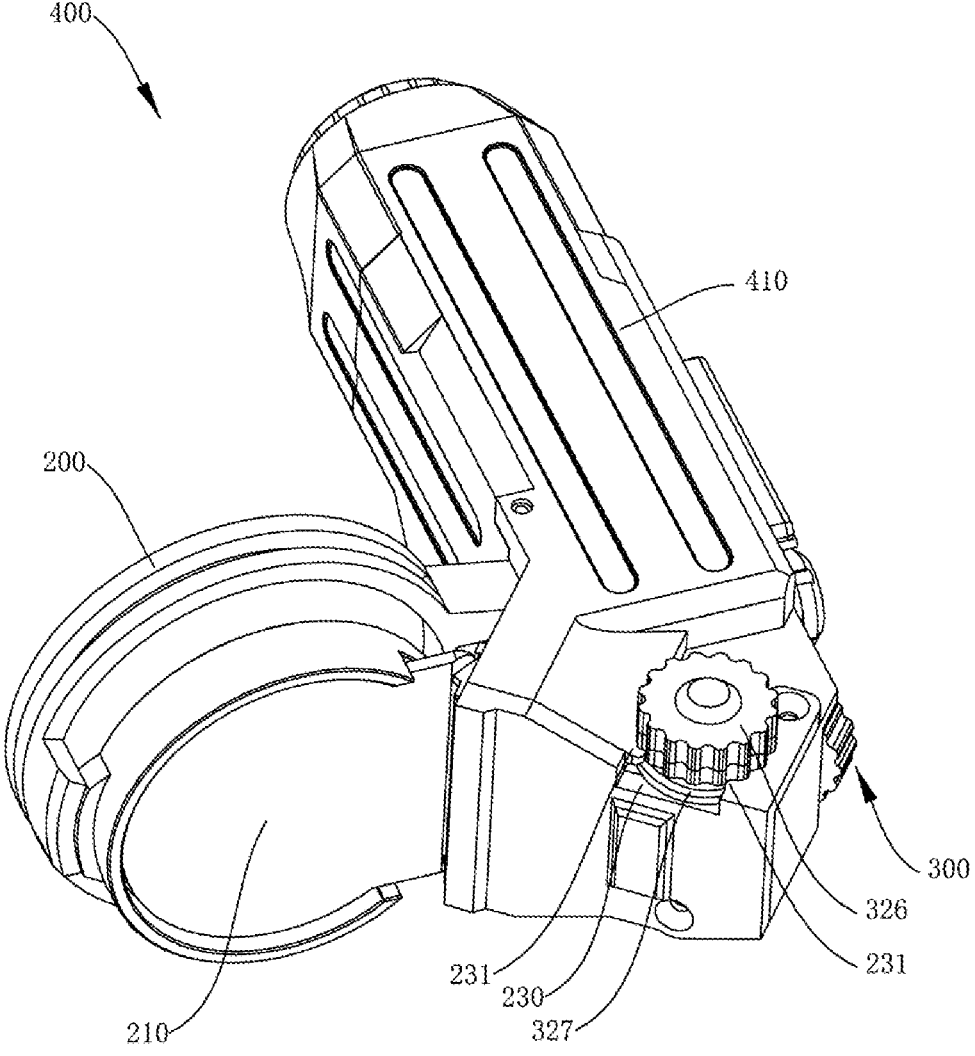
FIG. 3 is a schematic structural diagram according to another embodiment of the present invention.

As shown in FIGS. 1-3, in the embodiment of the present invention, a knob 326 is provided at an end of the longitudinal adjustment screw 325 and is provided with a limiting slot 327 along the circumferential direction, the base 200 is provided with a guide groove 230 in the first direction, two guide blocks 231 are symmetrically provided at a notch of the guide groove 230, both the guide blocks 231 extend in the first direction, the knob 326 is slidingly accommodated in the guide groove 230 in the first direction, and when the lateral sliding block 311 slides in the first direction and drives the longitudinal sliding block 321 to synchronously slide in the first direction, the knob 326 can slide along the guide groove 230. Symmetrical insertion of the two guide blocks 231 into the limiting slot 327 limits movement of the knob 326 in the second direction, thereby preventing the knob 326 from moving out of the guide groove 230 in the second direction during sliding. The above configuration ensures that the knob 326 does not disengage from the base 200 in the second direction while moving in the first direction.

Referring to FIG. 1, in the embodiment of the present invention, a positioning member 240 is provided on the base 200, the positioning member 240 is located on one side of the knob 326 in the first direction and is threadedly connected to the base 200, an edge of the positioning member 240 is inserted into a limiting slot 327, and the positioning member 240 can press down the knob 326 to stop rotation of the longitudinal adjustment screw 325. Specifically, the positioning member 240 may be in the form of a screw with a flat head having one end threadedly connected to the base 200 and the other end inserted into the limiting slot 327, and when the positioning member 240 is screwed, the positioning member 240 gradually presses against the knob 326, so that the knob 326 is not easily rotated, and a rotation of the knob 326 can be stopped. Of course, it will be appreciated that the lateral adjustment screw 315 may be stopped rotating by other positioning members 240.

As shown in FIGS. 1 and 2, a limiting column 250 is further provided on the base 200, slidably provided on the base 200 in a second direction and is located on one side of the longitudinal sliding block 321 facing away from the knob 326, the limiting column 250 is elastically connected to the base 200 and can push the longitudinal sliding block 321 in the second direction at all times, one end of the longitudinal sliding block 321 facing the limiting column 250 is provided with a groove 322, the bottom surface of the groove 322 is arc-shaped, wedge-shaped, dovetail-shaped or planar, and the top surface of the limiting column 250 is an arc-shaped surface, a wedge-shaped surface, a dovetail-shaped surface or a plane which conforms to the groove 322; the limiting column 250 abuts against the groove 322 through a top surface of the limiting column 250, and the groove 322 extends in the first direction. It can be understood that the elastic connection between the limiting column 250 and the base 200 may be that the limiting column 250 itself is elastic, for example, the limiting column 250 is made of an elastic material, or the limiting column itself is a spring; it is also possible that a spring is provided between the limiting column 250 and the base 200, and one end of the spring abuts against the limiting column 250, and the other end abuts against the base 200, so that the limiting column 250 always has a tendency to push the longitudinal sliding block 321. With the above configuration of the limiting column 250, the longitudinal sliding block 321 can be always pressed between the limiting column 250 and the longitudinal adjustment screw 325 when sliding in the second direction, so that the sliding process of the limiting column 250 is more stable, and in addition, the thrust force of the limiting column 250 can also eliminate the thread engagement clearance between the longitudinal adjustment screw 325 and the longitudinal sliding block 321 and the engagement clearance between the longitudinal adjustment screw 325 and the base 200.

With reference to FIG. 1, the lateral sliding block 311 in the embodiment of the present invention is provided with a first guide column 312 and a second guide column 313, wherein the first guide column 312 and the second guide column 313 are provided in a first direction and both extend in a second direction, the cross section of the first guide column 312 on a plane perpendicular to the second direction is dovetail-shaped or wedge-shaped, and the cross section of the second guide column 313 on a plane perpendicular to the second direction is square. The longitudinal sliding block 321 is provided with a first sliding groove 323 and a second sliding groove 324 which are slidably fitted with and conform to the first guide column 312 and the second guide column 313 respectively, i.e., the first sliding groove 323 is a dovetail-shaped groove or a wedge-shaped groove, and the second sliding groove 324 is a square groove. The first guide column 312 and the second guide column 313, which extend in the second direction synchronously, can provide a guide for the longitudinal sliding block 321 when the longitudinal sliding block 321 slides in the second direction, and in addition can also serve to drive the longitudinal sliding block 321 to slide synchronously in the first direction when the lateral sliding block 311 slides in the first direction, wherein the first guide column 312, which is dovetail-shaped, can also prevent the longitudinal sliding block 321 from disengaging from the lateral sliding block 311. It will be appreciated that upon adjusting the position of the display 220, the knob 326 may be stopped by the positioning member 240 of the previous embodiment, which further maintains the position of the longitudinal sliding block 321 such that the longitudinal sliding block 321 is no longer sliding in the second direction but maintains the position of the lateral sliding block 311 via the first guide column 312 and the second guide column 313. The embodiment of the present invention does not provide both guide columns in the form of a dovetail-shaped cross-section to facilitate machining, the machining of a dovetail-shaped guide column is more complicated than that of a square guide column, and accordingly, the machining difficulty of a dovetail-shaped sliding groove is higher than that of a square sliding groove.

In another embodiment of the present invention, it is also possible that the lateral sliding block 311 or the longitudinal sliding block 321 is alternatively provided with a guide bolt and the other with a kidney-shaped groove extending in the second direction, the guide bolt is slidable in the second direction relative to the kidney-shaped groove, the axial direction of the guide bolt is perpendicular to both the first direction and the second direction. When the lateral sliding block 311 drives the longitudinal sliding block 321 to slide in a first direction, the kidney-shaped groove can give a pushing force to the guide bolt in a first direction, and when the longitudinal sliding block 321 slides relative to the lateral sliding block 311 in a second direction, the guide bolt can slide along the length direction of the kidney-shaped groove. As shown in FIGS. 1 and 2, in the embodiment of the present invention, the lateral sliding block 311 is provided with a first threaded hole (not shown in the figures) in a first direction, the lateral adjustment screw 315 is in threaded engagement with the first threaded hole, the longitudinal sliding block 321 is provided with a second threaded hole 328 in a second direction, the longitudinal adjustment screw 325 is in threaded engagement with the second threaded hole 328, the lateral adjustment screw 315 is sleeved with a compression spring 316 having one end abut against the lateral sliding block 311, and the other end abut against the base 200. By providing the compression spring 316, the threaded engagement clearance in the first direction between the lateral adjustment screw 315 and the first threaded hole and the installation clearance in the first direction between the lateral adjustment screw 315 and the base 200 are eliminated, making the adjustment process more accurate and reliable. It should be noted that in the embodiment in which the first threaded hole and the second threaded hole are not provided, the lateral adjustment screw 315 can also be provided in a threaded connection with the base 200, and when the lateral adjustment screw 315 is rotated, the lateral adjustment screw 315 not only rotates but also moves in a first direction under threaded engagement, so that the lateral adjustment screw 315 can push the end of the lateral sliding block 311, and when the lateral sliding block 311 needs to be moved in a direction, it can be reset by means of a spring or the like between the lateral sliding block 311 and the base 200; similarly, the longitudinal adjustment screw 325 may also push the longitudinal sliding block 321 in the second direction in the same manner as described above.

Referring to FIG. 1, the lateral sliding blocks 311 in the embodiment of the present invention are respectively provided with a bump 314 at both ends in the second direction, the bump 314 is slidably received in the base 200 in the first direction, and accordingly, a sliding groove extending in the first direction may be provided on the base 200 to receive the bump 314 and allow the bump 314 to slide.

Figure 4:
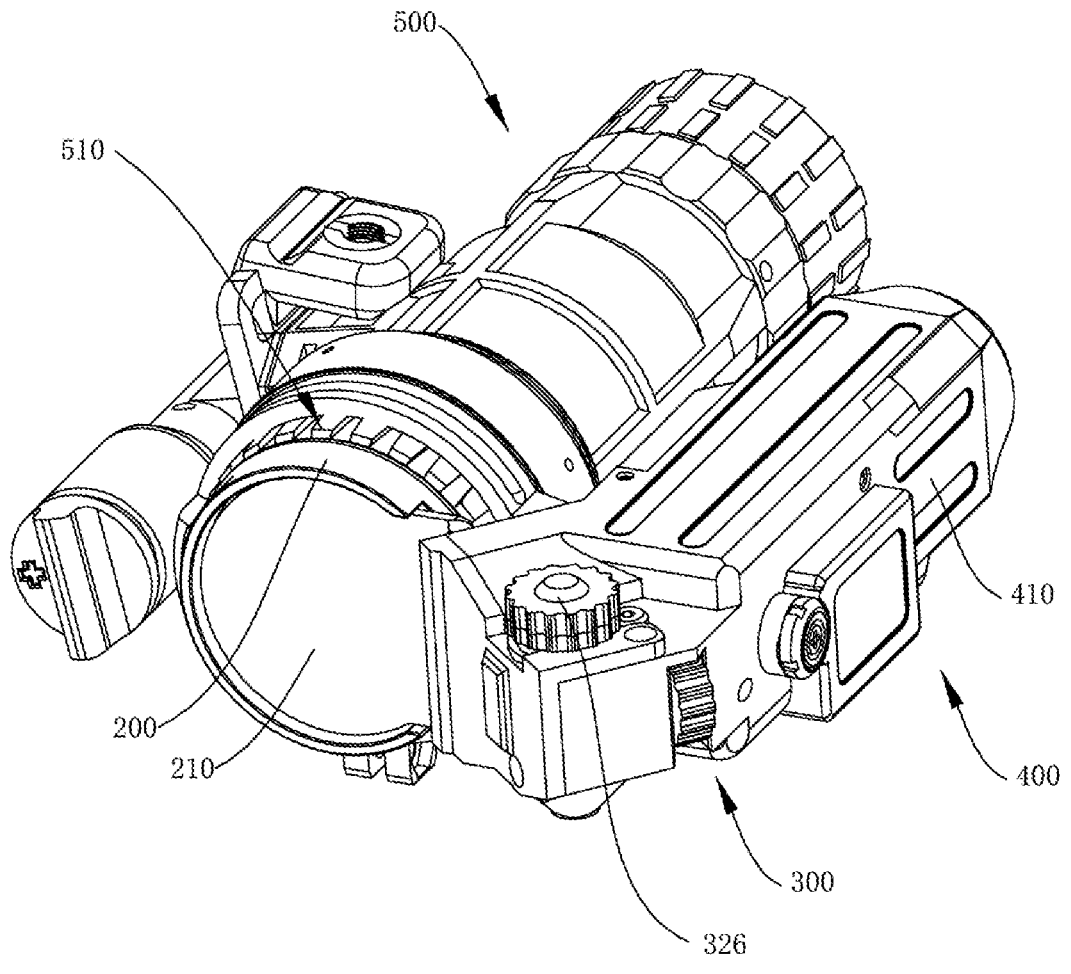
FIG. 4 is a schematic structural diagram showing being externally-hung to a low-light-level night-vision device according to another embodiment of the present invention.

As shown in FIGS. 3 and 4, in another embodiment of the present invention, an externally-hung thermal imaging device 400 is also disclosed, including a display calibration mechanism 100 as in any of the previous embodiments, further including a thermal imager 410 and a projector 420.

The thermal imager 410 is provided on the base 200 and is electrically connected to the display 220 which can receive and display thermal imaging pictures acquired by the thermal imager 410, a projector 420 is provided on the base 200 for mapping the thermal imaging picture displayed on the display 220 onto an imaging member 210; wherein the base 200 is configured to be connectable to a low-light-level night-vision device 500 and to position the imaging member 210 at a position corresponding to a low-light-level picture on the low-light-level night-vision device 500, the imaging member 210 is a transparent member and is transmissive to the low-light-level picture on the low-light-level night-vision device 500.

It will be appreciated that when in use, the externally-hung thermal imaging device 400 is firstly mounted on the low-light-level night-vision device 500 in the prior art, and the imaging member 210 is made to correspond to the low-light-level picture of the low-light-level night-vision device 500; since the display 220 can display the thermal imaging picture acquired by the thermal imager 410, and the projector 420 can map the thermal imaging picture onto the imaging member 210, a user can simultaneously observe the low-light-level picture displayed through the imaging member 210 and the thermal imaging picture mapped onto the imaging member 210, the two pictures are superposed at the position of the imaging member 210 to overcome the problem that the traditional front low-light-level and thermal fusion night-vision device cannot display colors, the problem of halos and reflected light in strong light environment, and the problem of image blurring when focusing near, and also solve the problem that the traditional rear low-light-level and thermal fusion night-vision device can reduce the low-light-level channel brightness and the problem of poor universality caused by reflecting the thermal imaging image into the eyepiece through the prism.

It should be noted that the imaging member 210 in the embodiments of the present invention can be an optical waveguide glass, and the display technology of the optical waveguide glass and the projector 420 used therewith are prior art in the art. The optical waveguide glass can be used as a projection screen or a projection board to project an image signal emitted by the projector 420. For example, the above-mentioned optical waveguide technology is disclosed in Chinese utility model patent with the publication No. CN217543544U.

As shown in FIG. 4, in the embodiment of the present invention, the base 200 may be connected with the eyepiece 510 of the low-light-level night-vision device 500, and the imaging member 210 is provided coaxially with the eyepiece 510 of the low-light-level night-vision device 500 and located on one side of the eyepiece 510 closer to the human eye, i.e., the rear side in practice. A detachable externally-hung structure is realized, which can be applied to any existing low-light-level night-vision device 500 on the market, with high universality, and can indeed realize externally-hung rear placement.

Existing optical waveguide glass products and associated control devices may be used for the embodiments of the present invention. The present invention superimposes a thermal imaging image on a low-light-level image by using an optical waveguide glass manufactured by a nanoimprint technique, the optical waveguide glass is located behind the low-light-level night-vision device 500 eyepiece 510, without requiring any modification of the low-light-level night-vision device 500 eyepiece 510 optical system, instead of the complicated imaging optical system of a conventional externally-hung rear thermal fusion night-vision device. In addition, since the optical waveguide glass has a small volume, it can be mounted on the existing low-light-level night-vision device 500 as the externally-hung front thermal fusion night-vision device, which has the advantages that the thermal imaging image and the low-light-level image of the externally-hung rear thermal fusion night-vision device are imaged through a separate channel and then superimposed on the eyepiece 510, and has a high universality that the externally-hung front thermal fusion night-vision device can be mounted on any existing low-light-level night-vision device 500, and at the same time, the disadvantages of the externally-hung rear low-light-level night-vision device, such as large weight, large volume and high cost, and the disadvantages of the externally-hung front thermal fusion night-vision device affecting the imaging performance of the low-light-level channel are eliminated. It should be noted that the display 220 indicated in the present invention is a micro-display 220, and in addition, the low-light-level night-vision device 500 in FIG. 4 of the present invention is only a part of the low-light-level night-vision device 500 and serves as a schematic function, not showing the whole structure of the low-light-level night-vision device 500.

Each technical feature of the above-mentioned embodiments can be combined in any combination, and in order to make the description concise, not all the possible combinations of each technical feature in the above-mentioned embodiments are described; however, as long as there is no contradiction between the combinations of these technical features, they should be considered as the scope of the description.

Of course, the present invention is not limited to the above-described embodiments, and equivalent modifications or substitutions may be made by a person skilled in the art without departing from the spirit of the present invention, and all such equivalent modifications or substitutions are intended to be included within the scope of the present invention as defined by the claims.

The invention claimed is:

1. A display calibration mechanism, wherein the display calibration mechanism is used for adjusting a position of a thermal imaging picture so that the thermal imaging picture can be aligned with a low-light-level picture on a low-light-level night-vision device, and the display calibration mechanism comprises a base provided with an imaging member and a display for displaying a thermal imaging picture, the thermal imaging picture on the display and the low-light-level picture on the low-light-level night-vision device are simultaneously imagable on the imaging member, and an adjustment assembly located on the base for adjusting a position of the display relative to the base, when the position of the display relative to the base changes, the position of the thermal imaging picture on the imaging member changes accordingly, and the adjustment assembly comprises:

a lateral adjustment unit comprising a lateral sliding block and a lateral adjustment screw, wherein the lateral sliding block is slidably provided on the base in a first direction, the lateral adjustment screw is rotatably provided on the base, and the lateral adjustment screw is used for adjusting a position of the lateral sliding block relative to the base in the first direction; and a longitudinal adjustment unit comprising a longitudinal sliding block and a longitudinal adjustment screw, wherein the display is mounted on the longitudinal sliding block slidably provided on the lateral sliding block in a second direction, and the second direction is perpendicular to the first direction, the longitudinal adjustment screw is rotatably provided on the base, and the longitudinal adjustment screw is used for adjusting a position of the longitudinal sliding block relative to the base in the second direction.

2. The display calibration mechanism according to claim 1, wherein a first guide column and a second guide column are provided on the lateral sliding block and are provided in the first direction and both extend in the second direction, a cross section of the first guide column on a plane perpendicular to the second direction is dovetail-shaped or wedge-shaped, a cross section of the second guide column on a plane perpendicular to the second direction is square, the longitudinal sliding block is provided with a first sliding groove and a second sliding groove which are slidably fitted with and have shapes conforming to the first guide column and the second guide column respectively.

3. The display calibration mechanism claim 1, wherein either the lateral sliding block or the longitudinal sliding block is provided with a guide bolt and the other with a kidney-shaped slot extending in a second direction, the guide bolt is slidable in the second direction relative to the kidney-shaped slot, and an axial direction of the guide bolt is perpendicular to both the first direction and the second direction.

4. The display calibration mechanism claim 1, wherein the lateral sliding block is provided with a first threaded hole in the first direction, the lateral adjustment screw is in threaded engagement with the first threaded hole, the longitudinal sliding block is provided with a second threaded hole in the second direction, the longitudinal adjustment screw is in threaded engagement with the second threaded hole, the lateral adjustment screw is sleeved with a compression spring having one end abut against the lateral sliding block and the other end abut against the base.

5. The display calibration mechanism according to claim 1, wherein the lateral sliding blocks are provided with bumps at both ends in the second direction, respectively, and the bumps are slidably received in the base in the first direction.

6. The display calibration mechanism according to claim 1, wherein a knob is provided at an end of the longitudinal adjustment screw and is provided with a limiting slot in a circumferential direction, the base is provided with a guide groove in the first direction, two guide blocks are symmetrically provided at a notch of the guide groove, both of the two guide blocks extend in the first direction, the knob is slidingly received in the guide groove in the first direction, and the two guide blocks are symmetrically inserted into the limiting slot to prevent the knob from escaping from the guide groove in the second direction during sliding.

7. The display calibration mechanism according to claim 6, wherein a positioning member is provided on the base, located on one side of the knob in the first direction and is threadedly connected to the base, an edge of the positioning member is inserted into the limiting slot, and the positioning member can depress the knob to stop rotation of the longitudinal adjustment screw.

8. The display calibration mechanism according to claim 6, wherein a limiting column is further provided on the base, slidably provided on the base in the second direction and is located on oneside of the longitudinal sliding block facing away from the knob, the limiting column is elastically connected to the base and can push the longitudinal sliding block in the second direction at all times, one end of the longitudinal sliding block facing the limiting column is provided with a groove, a bottom surface of the groove is arc-shaped, wedge-shaped, dovetail-shaped or planar, and a top surface of the limiting column is an arc-shaped surface, a wedge-shaped surface, a dovetail-shaped surface or a plane which conforms to the groove; the limiting column abuts against the groove through the top surface of the limiting column, and the groove extends in the first direction.

9. An externally-hung thermal imaging device, comprising the display calibration mechanism according to claim 1, further comprising:

a thermal imager provided on the base and electrically connected to a display, the display being capable of receiving and displaying thermal imaging pictures acquired by the thermal imager;

a projector provided on the base and used for mapping the thermal imaging pictures displayed on the display onto an imaging member;

wherein the base is configured to be connectable to a low-light-level night-vision device and position the imaging member at a position corresponding to a low-light-level picture on the low-light-level night-vision device, the imaging member is a transparent member and is transmissive to the low-light-level picture on the low-light-level night-vision device.

10. The externally-hung thermal imaging device according to claim 9, wherein the imaging member is an optical waveguide glass, the base is connectable to an eyepiece of the low-light-level night-vision device, and the imaging member is provided coaxially with the eyepiece of the low-light-level night-vision device and on one side of the eyepiece closer to a human eye.

* * * * *